Patented Jan. 28, 1941

2,230,211

UNITED STATES PATENT OFFICE 2,230,211

PLASTIC COMPOSITION

Manvel C. Dailey, Maywood, Ill., assignor to United States Gypsum Company, Chicago, Ill., a corporation of Illinois No Drawing. Application November 26, 1937, Serial No. 176,627

8 Claims. (Cl. 106—34)

The present invention relates to a cementitious plastic composition containing a setting material such as cement or plaster, set-modifying ingredients and water-soluble, migrating accelerative salts or water-soluble, migrating protective colloids, for the purpose of producing a mixture which when gauged with water will set under such conditions that there will be a uniform browning out or complete hydration of the surface during the setting, while the drying out of the surface skin and the formation of soft unset surfaces will be successfully prevented.

Primarily the invention is concerned with an improved plaster composition comprising as the particular setting ingredient some form of calcium sulfate hemihydrate or other form of calcined gypsum capable of setting, with the addition of set-modifying materials such as alum or its equivalent, lime, or products forming $Ca(OH)_2$ by hydrolysis when mixed with water, retarder, and migrating accelerative salts or migrating protective colloids.

One of the objects of the invention is to provide means within a plaster which, because of their soluble or migratory characteristics, will tend to come to the surface of a gauged mass of plaster or cement during the time of natural evaporation of water from such surface. In the case of protective colloids, rate of evaporation of moisture from the surface will thus be reduced, thereby keeping moisture in contact with unset portions of plaster for a length of time sufficient to prevent dry outs. On the other hand, if these migratory materials are of an accelerative nature they will insure the setting or hydration of the surface before the water therein contained can evaporate and hence escape combination with the plaster or cement.

Gypsum plaster as customarily employed under job conditions is used in admixture with sand and other conventional filling materials which may be desired to vary the working properties of the mixture. It is obvious that a sufficient quantity of water must also be added not only to supply the amount necessary to combine with the calcium sulfate hemihydrate to hydrate it and hence cause it to set but also to render the mixture sufficiently plastic to permit its application to a wall or other surface where it is to be used. It hence follows that such excess water must be removed from the material by evaporation in order to leave a hard, dry, set mass. Evaporation of this water, however, tends to bring to the surface of the plaster water-soluble materials therein present.

Gypsum plasters generally contain a small amount of retarder to lengthen the natural setting time of the therein contained calcium sulfate hemihydrate. The most usual type of retarder employed is essentially a partially hydrolyzed keratinous protein, generally extended or diluted by addition of lime. Gypsum plasters may also contain other ingredients, such as set-stabilizing materials, added to modify the setting or working characteristics of such plasters. When plasters containing retarder are mixed with water and applied to walls or other surfaces, natural evaporation of excess water contained in such plaster carries to the surface of the plaster soluble constituents of the retarder. As a result, the active soluble retardive agents concentrated on the surface of the plaster tend to cause the formation of an unset skin of plaster on the surface which will not set or hydrate for several hours after the major portion of the plaster has set. Some agents appear to aggravate this condition. For example, a set-stabilized plaster containing considerable excess lime develops a rather thick surface skin which does not set or hydrate for several hours after the major portion of the plaster has set.

Under conditions favoring rapid drying, such as occur in hot, dry weather, or when freshly plastered surfaces are very thin and exposed to wind or rapid air circulation, the rate of drying may be so fast that all of the water in the plaster may be evaporated therefrom before this surface skin has completely hydrated or set. The result is a thin skin of soft, unset plaster covering the main body of the plaster, and the condition is generally termed a "surface dry out." While it is possible to remedy this condition by spraying the plaster with water or a solution of set-accelerative salt subsequent to formation of the dry out, such remedial procedure is time consuming and hence expensive. It is therefore desirable that plaster dry at a slow rate to insure presence of enough water in the plaster for a sufficient time to allow complete hydration of the surface skin as well as the major portion of the plaster. An alternative is to so compound the plaster that formation of this surface skin is prevented or its setting time is brought closer to the time of set of the main body of the plaster. When plaster has set completely to the surface it is commonly referred to as having "browned out." It will be evident from the above discussion that the major portion of plaster may be "set" before "browning out" occurs to any appreciable extent.

There have been described and used in the past a number of plasters the setting time of which has been stabilized against adventitiously therewith admixed retardive and accelerative influences. Such plasters contain certain types of accelerative materials, as well as a larger amount of retarder than is ordinarily present in unset stabilized plasters, the idea being that the excess retarder is more or less balanced by the accelerative material, so that the plaster will have a predetermined time of set, irrespective of whether or not, under job conditions and in handling, further accelerators, such as previously set plaster or retarders, in the nature of organic materials, get into the plaster. Because of the presence in such plasters of rather large quantities of retarder, the formation of unset surface skin is aggravated, particularly in summer or under conditions conducive to rapid drying.

Therefore, one of the primary objects of this invention is to provide a plaster composition that "browns out" uniformly and is not subject to dry outs, an additional object being to provide a plaster composition which does not form an unset surface film. It will also be apparent that a plaster composition made in accordance with the principles set forth in the present specification and in accordance with the present invention will possess a superior bond for subsequently thereto applied plaster as well as a surface of improved quality.

Though for purposes of illustration the present invention is described in connection with a calcium sulfate hemihydrate plaster, it will be obvious that it will be applicable to mixtures thereof as well. Also, the principles disclosed herein may be applied with equal effectiveness to other cementitious materials such as lime, hydraulic cement and any others, where, upon evaporation of the excess water, a soluble film is obtained on the surface of the plaster. While for best results it is preferred to utilize the present invention in connection with plaster of Paris compositions, it is to be distinctly understood that the invention is by no means limited thereto.

The term calcined gypsum as it is employed in this specification and the appended claims has reference to any at least partially dehydrated gypsum which is capable of setting up into a firm mass rather rapidly and is in common use for preparing ordinary plaster compositions. Examples of such rapidly setting calcined gypsum materials are calcium sulfate hemihydrate or the soluble anhydrite which, because of its crystalline structure, sets rather rapidly in the presence of water. These substances are to be distinguished from the so-called Keene's cement or dead burned gypsum or the natural calcium sulfate anhydrite, which sets very slowly in the presence of water unless comparatively large amounts of set inducing substances are added.

It has been found by the inventor that it is relatively easy to prevent surface dry outs by employing either of two methods, or both of them. In the first method there are employed, as additive materials to the plaster, soluble migrating gums which tend to migrate to the surface of the plaster together with other soluble constituents present therein. Because of the fact that these gums have a marked affinity for water, they will restrain its evaporation and hence will retain it tenaciously either on or near the surface of the drying and setting plaster coat. As the result of this retention of water, any unset calcium sulfate hemihydrate or other cementitious material which is subjected to the influence of the migrating soluble retarding material which is becoming concentrated on the surface will have sufficient water retained around it to permit it to set, even though it sets slower than the setting material in the body of the plaster. This therefore prevents the formation of a soft, unset surface coat.

In Table 1, hereinbelow, this effect has been obtained specifically by the use of gum arabic and dextrin, but it will be apparent to those skilled in the art that other soluble gums or carbohydrates will have a similar effect, equivalents for this purpose being, for example, such materials as karaya gum, British gum, or similar water-soluble or dispersible colloidal materials.

In the following table, plasters were mixed with 2 parts of sand and applied to panels to a thickness of ½ inch, the panels being stored in a room at 90° F., 35% to 40% relative humidity, and under conditions of uniform air circulation. Time of set refers to time required for major portion of the plaster to set. Scum thickness refers to thickness of unset surface skin. All times given are referred to zero time at beginning of mixing.

TABLE I

*Migrating set-protective colloids*

| Formula | 1 | 2 | 3 |
|---|---|---|---|
| | Pounds | Pounds | Pounds |
| Stucco | 2,000 | 2,000 | 2,000 |
| Alum | 7½ | 7½ | 7½ |
| Lime | 12½ | 12½ | 12½ |
| Retarder | 8 | 8 | 8 |
| Gum arabic | 5 | | |
| Dextrin | | 5 | |

| Formula | 1 | 2 | 3 |
|---|---|---|---|
| Time of set | 3 hrs. 20 mins. | 3 hrs. 35 mins. | 2 hrs. 35 mins. |
| Scum thickness | 3/32 in | 3/32 in | ⅛ in. |
| Browning—start | 6 hrs. 0 mins. | 7 hrs. 20 mins. | 6 hrs. 25 mins. |
| Browning—50% | 9 hrs. 0 mins. | 9 hrs. 0 mins. | 50% dry out 8 hrs. 0 mins. |
| Browning—95+% | 18 hrs. 0 mins. | 18 hrs. 0 mins. | 100% dry out 8 hrs. 30 mins. |

In the formula shown in Table 1, it should be noted that formula 3, which contains no protective migrating colloids, shows a 50% surface dry out in 8 hours and a 100% surface dry out in 8½ hours. In other words, excess water contained in the plaster was completely evaporated within 8½ hours, leaving a surface skin of unset plaster. This shows a very rapid evaporation of moisture from the surface which results in a surface which has not set and browned out properly but which has a scum coat ⅛ inch thick left thereon. Comparing this result with the results shown in connection with formulas 1 and 2, which contain gum arabic and dextrin, respectively, it will be seen that although the browning-out action starts and is 50% complete within 9 hours, the final drying out is delayed for an additional perod of over 9 hours and hence is not completed until more than 18 hours have elapsed. This is a desirable effect because it permits the proper and complete setting or browning of the surface. Thus the effect of the migrating colloids upon the formation of a scum coat is noted, and the resulting beneficial results are of great value not only in obtaining a better bond between subsequent plaster coats and the plaster already in place but also in causing less interference and annoyance to the plastering craftsmen, together with increased efficiency and a greater output.

It has been found that the same desirable final results may be obtained by using, instead of protective colloids, which delay evaporation and hence permit setting of the plaster, certain migrating accelerative salts. Table 2 hereinbelow shows the effect upon browning characteristics of certain migrating salts which are applied to a formula such as No. 3 of Table 1, which, as has already been mentioned, is defective in browning characteristics. The reagents mentioned in Table 2 were applied to a plaster formulated according to formula 3 of Table 1 in quantities of about 3 pounds thereof per ton of plaster.

TABLE 2

*Migrating accelerative salts*

|  | Set | Browning | | |
| --- | --- | --- | --- | --- |
|  |  | Start | 50% | 95-100% |
| Sodium ammonium chlorate | 2 hrs. 45 mins | 3 hrs. 0 mins | 4 hrs. 0 mins | 5 hrs. 0 mins. |
| Sodium chlorate | 2 hrs. 30 mins | 2 hrs. 30 mins | 3 hrs. 45 mins | 4 hrs. 45 mins. |
| Sodium carbonate | 2 hrs. 10 mins | 2 hrs. 10 mins | 2 hrs. 55 mins | 4 hrs. 10 mins. |
| Sodium nitrate | 2 hrs. 50 mins | 2 hrs. 50 mins | 4 hrs. 20 mins | 5 hrs. 20 mins. |
| Sodium acid sulfate | 2 hrs. 40 mins | 2 hrs. 40 mins | 2 hrs. 55 mins | 3 hrs. 55 mins. |

It is to be noted particularly that in using migrating accelerative salts the browning starts very rapidly and is completed within three hours after the start of the phenomenon. For example, when using sodium acid sulfate the browning starts in 2 hours and 40 minutes and is completed in 3 hours and 55 minutes or within 1 hour and 15 minutes from the time it started. This is an exceedingly rapid browning effect and is very useful in certain cases, since it allows the plastering craftsmen to apply succeeding coats of plaster within a relatively short time. In other words, when using migrating accelerative salts, the rate of setting of the surface is greatly hastened as contrasted with the use of migrating colloids, in which case the rate of drying is retarded. While it thus appears that the mechanism of action of the migrating colloids is not the same as that of the migrating salts, the result is the same—the assurance of a hard properly set surface coat.

The action of soluble accelerative salts in hastening the time of set of the normally slow setting surface skin may be due to the fact that such salts are carried to the surface along with the soluble set-retarding constituents present in the plaster. They tend to counteract the effect of retarder concentration at the surface by also concentrating set-accelerative salts at the surface, thereby neutralizing the effect of such retarder.

It will be obvious to those skilled in the art that in addition to the migrating accelerative salts specifically mentioned in Table 2, other equivalent materials may be used, as for example potassium acid sulfate, potassium nitrate, ammonium carbonate, calcium chloride, etc. Soluble salts which react with normal constituents of the plaster, such as $CaSO_4$ or $Ca(OH)_2$, to form other soluble, accelerative salts are also satisfactory. For example, alkali carbonates react with $CaSO_4$ as shown to form soluble, migrating, accelerative alkali sulfates:

$$R_2CO_3 + CaSO_4 = R_2SO_4 + CaCO_3$$

Soluble accelerative salts which react with constituents of the plaster to form only insoluble, nonmigratory reaction end products are not suitable for hastening the rate of browning of the surface of plaster. For example, in a plaster containing lime in more than chemical equivalent amount to react with added copper sulfate, little or no acceleration of surface set would occur by addition of the copper salt. Upon addition of water to such a plaster, the following reaction takes place:

$$2H_2O + Ca(OH)_2 + CuSO_4 = CaSO_4.2H_2O + CuO + H_2O$$

The reaction end products, $CaSO_4.2H_2O$ and $CuO$, are both essentially insoluble, hence do not migrate to the surface during drying to neutralize the effect of retarder concentration at the surface. It should be noted that $CaSO_4.2H_2O$, formed by the above reaction, is in itself a set accelerator and that therefore the addition of $CuSO_4$ to a plaster as described will appreciably hasten the set of such plaster as a whole, unless sufficient additional retarder is added to counteract the accelerative effect of the copper sulfate.

Satisfactory set-accelerative salts for accomplishing acceleration of rate of browning may be classified as follows:

(1) Salts which do not enter into chemical combination or reaction with other constituents of the plaster.
(2) Salts which do enter into chemical combination or react with other constituents of the plaster to form as end products of such reaction one or more soluble, set-accelerative compounds.

Representative salts in the first group include alkali chlorides and nitrates, calcium chloride, nitrate, chlorate, etc. Representative salts in the second group include strontium and barium chloride and nitrate, alkali carbonates, etc. It should be noted that addition of such salts accelerates the setting time of gypsum plasters, hence their use will generally entail addition of slightly greater amounts of retarder than is normally required to regulate the set of a similar plaster not containing such accelerative salts.

Set stabilization is not accomplished as the result of including set accelerative, soluble salts and retarder in a gypsum plaster, and is not so claimed.

It is not intended to confine the present invention to the use of the formulas shown in connection with Table 1, as obviously the components present therein, including alum, lime and retarder, may be varied considerably without departing from the spirit of this invention, although for the best results it is preferred to apply the principles herein disclosed to compositions such as set-stabilized plasters having a general formula such as that shown in Table 1, although it is of course to be understood that they may be applied with similar results to other formulas which exhibit the formation of an unset scum coat on the surface during drying or browning periods.

As a further modification of the invention it will immediately be obvious that it is possible to combine the use of the soluble migrating colloids and the soluble migrating accelerative salts in proper proportions and thereby obtain any desired predetermined browning-out time. This is of great value in commercial operations. As a matter of convenience it is generally preferable to use the soluble accelerative salts, because they speed up the browning action. However, under unusually severe atmospheric conditions, particularly in hot and dry climates, the addition of the protective soluble migrating colloids may prove to be the more desirable of the two aspects of the present invention.

What is considered as being new and for which the protection of Letters Patent is prayed is:

1. A plaster composition having improved browning-out and surface-drying characteristics comprising calcium sulfate hemihydrate, set-stabilizing ingredients therefor, water-soluble migrating accelerative salts selected from the group consisting of the alkali metal chlorates, carbonates, nitrates, chlorides, and acid sulfates, the alkaline earth chlorates, nitrates and chlorides, and the ammonium chlorides, nitrates, chlorates and carbonates, and water-soluble migrating protective colloids selected from the group consisting of gum arabic, dextrin, karaya gum, and British gum.

2. A plaster composition having improved browning-out and surface-drying characteristics comprising calcium sulfate hemihydrate, a set-stabilizing composition therefor comprising retarder, material forming Ca(OH)$_2$ in water, and an acid-reacting water-soluble sulfate, and in addition thereto water-soluble migrating accelerative salts selected from the group consisting of the alkali metal chlorates, carbonates, nitrates, chlorides and acid sulfates, the alkaline earth chlorates, nitrates and chlorides, and the ammonium chlorides, nitrates, chlorates and carbonates, and water soluble migrating protective colloids selected from the group consisting of gum arabic, dextrin, karaya gum, and British gum.

3. A plaster composition having improved browning-out and surface-drying characteristics comprising calcium sulfate hemihydrate, alum, lime, retarder, and gum arabic.

4. A plaster composition having improved browning-out and surface-drying characteristics comprising calcium sulfate hemihydrate, alum, lime, retarder, and dextrin.

5. A plaster composition having improved browning-out and surface-drying characteristics comprising calcium sulfate hemihydrate, a set-stabilizing material, which latter comprises alum, lime and retarder, and a water-soluble migrating accelerating salt from the group consisting of the alkali metal chlorates, carbonates, nitrates, chlorides, and acid sulfates, the alkaline earth chlorates, nitrates and chlorides and the ammonium chlorides, nitrates, chlorates and carbonates.

6. A plaster composition having improved browning-out and surface-drying characteristics comprising calcium sulfate hemihydrate, a set-stabilizing composition comprising alum, lime and retarder, and sodium chlorate.

7. A plaster composition having improved browning-out and surface-drying characteristics comprising calcium sulfate hemihydrate, a set-stabilizing composition comprising alum, lime and retarder, and sodium nitrate.

8. A plaster composition having improved browning-out and surface-drying characteristics comprising calcium sulfate hemihydrate, a set-stabilizing composition comprising alum, lime and retarder, and sodium acid sulfate.

MANVEL C. DAILEY.